United States Patent [19]

Gorham et al.

[11] Patent Number: 5,339,088
[45] Date of Patent: Aug. 16, 1994

[54] METHOD AND APPARATUS FOR MEASUREMENT OF DIRECTION

[75] Inventors: Barry J. Gorham, Loughton; James R. Dudley, Waltham Abbey, both of England

[73] Assignee: British Technology Group Ltd., London, England

[21] Appl. No.: 966,198
[22] PCT Filed: Jul. 19, 1991
[86] PCT No.: PCT/GB91/01213
§ 371 Date: Jan. 10, 1993
§ 102(e) Date: Jan. 10, 1993
[87] PCT Pub. No.: WO92/01949
PCT Pub. Date: Feb. 6, 1992

[30] Foreign Application Priority Data

Jul. 20, 1990 [GB] United Kingdom ............ 9015945.0

[51] Int. Cl.$^5$ .................... G01S 3/02; G01B 11/26
[52] U.S. Cl. .................... 342/459; 356/141.1
[58] Field of Search ............ 356/141, 152, 4; 342/417, 459

[56] References Cited

U.S. PATENT DOCUMENTS

| | | | |
|---|---|---|---|
| 3,423,591 | 1/1969 | Schrempp . | |
| 3,912,397 | 10/1975 | Zoltan | 356/141 |
| 4,441,809 | 4/1984 | Dudley | 356/1 |
| 4,583,852 | 4/1986 | Cassidy | 356/152 |
| 4,627,724 | 12/1986 | Cameron | 356/141 |
| 4,703,167 | 10/1987 | Okumura | 356/141 |
| 4,973,156 | 11/1990 | Dainis | 356/141 |

FOREIGN PATENT DOCUMENTS 1410322 10/1975 United Kingdom .

Primary Examiner—Gregory C. Issing
Attorney, Agent, or Firm—Cushman, Darby & Cushman

[57] ABSTRACT

The invention provides a method and a corresponding instrument for measuring the direction of a remote source of radiation, the instrument comprising a support, a detector head rotatably mounted thereon for rotation about a fixed axis, and a position-indicator means which provides an output signal indicating the rotational position of the detector head, the detector head being provided with a detector sensitive to radiation emitted by the remote source and with optics for forming an image of the source which transits across the detector as the detector head rotates, the image-forming optics being such that the image comprises two line-image components which extend transversely to the transit direction and which are oppositely inclined to that direction, and the detector being arranged, in response to the transit across it of each line-image component, to cause the instantaneous angular position of the detector head as indicated by the position indicator to be recorded, there being further provided computer which derives two component measurements of the direction of the source from, respectively, the mean of the two recorded angular positions and the difference between them.

6 Claims, 2 Drawing Sheets

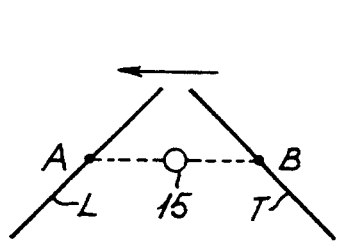
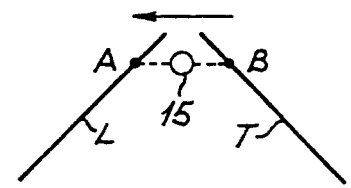
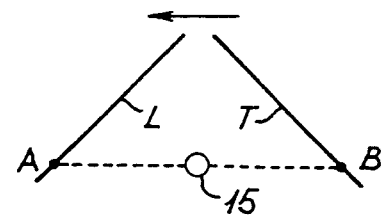
Fig. 3(i)   Fig. 3(ii)   Fig. 3(iii)
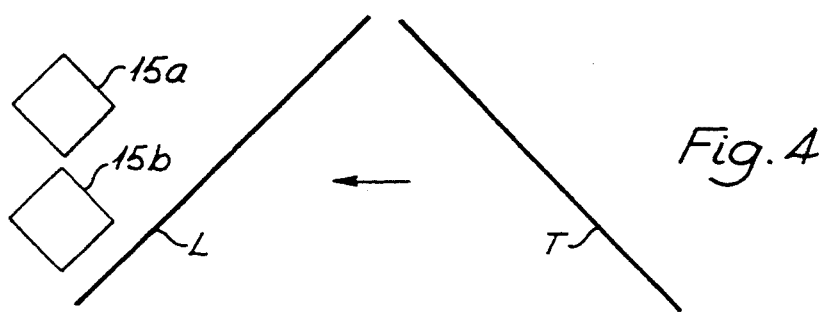
Fig. 4
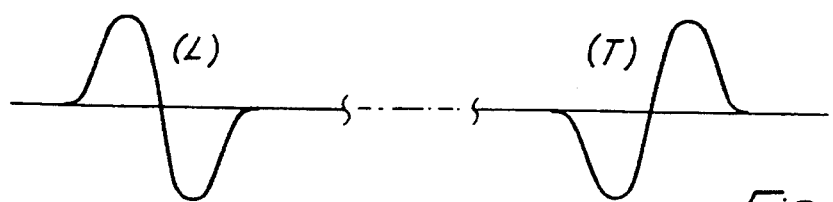
Fig. 5
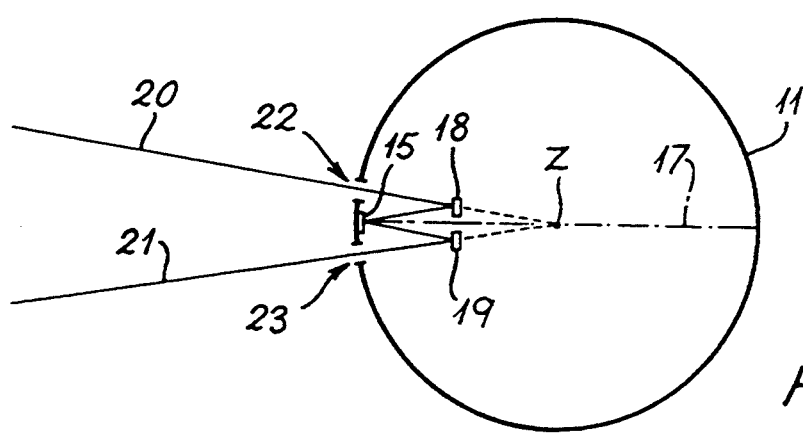
Fig. 6

METHOD AND APPARATUS FOR MEASUREMENT OF DIRECTION

This invention relates to a method and apparatus for a measurement of the direction, from a position at which the measurement is made, of an observed object or target, such measurement being comparable with directional measurements made with the use of a theodolite.

A conventional theodolite comprises a telescope, mounted to be rotatable about vertical and horizontal axes, and horizontal and vertical circular scales against which the angular position of the telescope can be measured, after it has been aligned on a remote target, to give a first reading related to the bearing or azimuthal direction of the target from the theodolite location and a second reading representing the elevational angle of the target above or below the horizontal. Such a theodolyte requires the co-operation of a human observer, both for aligning the telescope on the target and for reading the azimuthal and elevational data from the circular scales.

It is an object of the present invention to provide a method and apparatus by means of which such azimuthal and elevational data with respect to a suitable remote target can be obtained automatically, that is, without reliance on a human observer. A "suitable" target, for the purposes of the invention, is one which is, effectively, a point source of electromagnetic radiation, preferably but not necessarily in the visible or IR part of the spectrum. In practice, at a range in excess of about 3 meters even an ordinary torch bulb qualifies as a suitable target.

According to one aspect of the invention there is provided a direction-measuring instrument for measuring the direction of a remote source of radiation, the instrument comprising a support, a detector head rotatably mounted thereon for rotation about a fixed axis, and a position-indicator means which provides an output signal indicating the rotational position of the a detector head, the detector head being provided with detector sensitive to radiation emitted by the remote source and with optics for forming an image of the source which transits across the detector as the detector head rotates, the optics being such that the image comprises two line-image components which extend transversely to the transit direction and which are oppositely inclined to that direction, and the detector being arranged, in response to the transit across it of each line-image component, to cause the instantaneous angular position of the detector head as indicated by the position indicator to be recorded, there being further provided computor means which derives two component measurements of the direction of the source from, respectively, the mean of the two recorded angular positions and the difference between them.

In one embodiment of such a direction - measuring instrument according to the invention, the optics for forming an image comprises a pair of elongate cylindrical lenses mounted with their long axes oppositely skewed relative to the axis of rotation of the detector head and forming, of a distant source, correspondingly oppositely skewed line images which transit across the detector as the detector head rotates.

In another embodiment, the optics for forming an image comprises a pair of elongate concave cylindrical mirrors mounted with their long axes oppositely skewed relative to the axis of rotation of the detector head and forming, of a distant source, correspondingly oppositely skewed line images which transit across the detector as the detector head rotates.

According to another aspect of the invention there is provided a method of measuring the direction of a remote source of radiation comprising, in fixed relationship to one another and rotatable together about a fixed axis, a detector sensitive to the radiation emitted by the source and image-forming optics, forming an image of the remote source, the image comprising two line-image components oppositely skewed with respect to the fixed axis, rotating the detector and the image-forming optic together about the fixed axis and thereby causing the two line-image components of the image to transit across the detector, recording the two angular positions of the detector and image-forming optics at which the respective line-image components transit across the detector, and deriving two component measurements of the direction of the source from, respectively, the mean of the two recorded angular positions and the difference between them.

The nature of the invention will be understood from the following description of the preferred embodiments thereof with reference to the accompanying drawings, in which.

Figure 1:
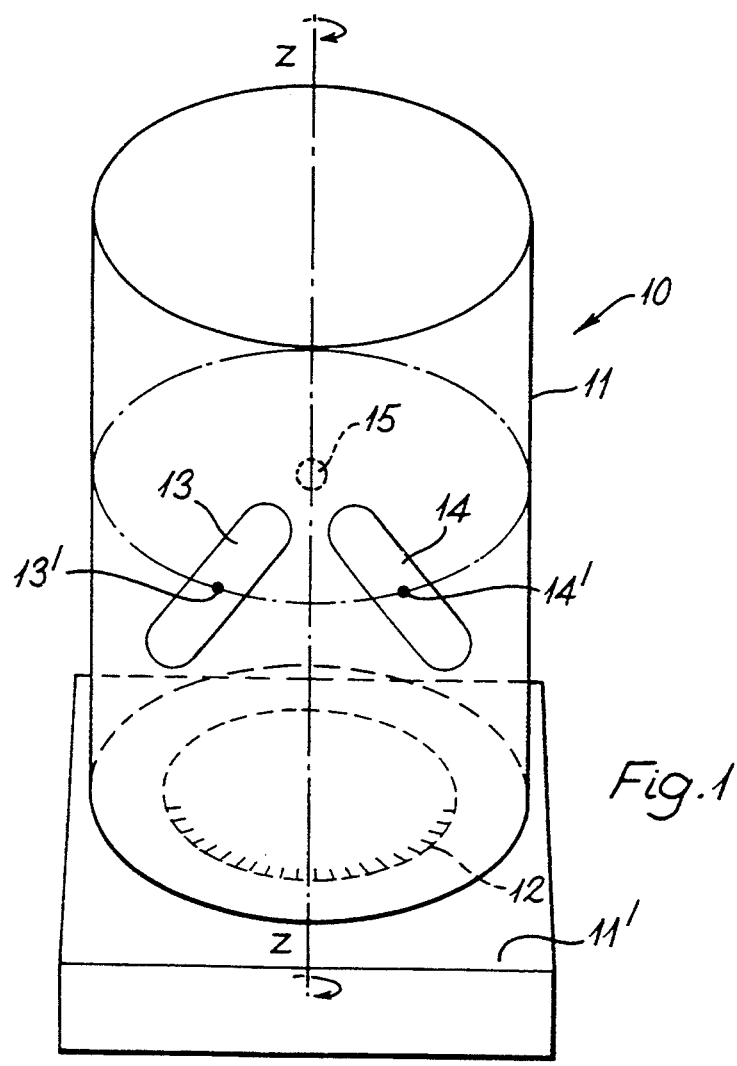
FIG. 1 is a diagrammatic perspective view of a stationary base or support and a rotatable sensor head of a direction measuring instrument In accordance with the invention.
Figure 2:
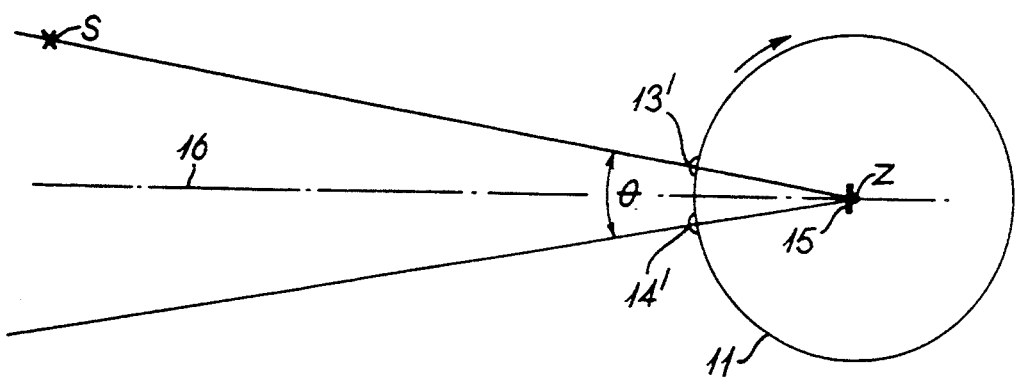
FIG. 2 is a diagrammatic horizontal sectional view of the sensor head shown in FIG. 1, showing also a remote target with respect to which the directional information is to be measured.

FIGS. 3(i), (ii) and (iii) are diagrams relating to a measurement of the elevational direction of the target;

FIG. 4 illustrates a refinement in the detector of the instrument shown in FIGS. 1 and 2;

FIG. 5 is a representation of an output signal produced by the detector in accordance with FIG. 4 incorporated tn an instrument otherwise in accordance with FIGS. 1 and 2; and FIG. 6 comparable with FIG. 2 and illustrates another embodiment of a sensor head of an instrument according to the invention.

The sensor head represented in FIG. 1 and indicated generally by reference numeral 10 comprises a cylindrical housing 11 mounted on a tripod or other stationary support 11' to be rotatable about an axis Z—Z of the housing, and the support is provided with adjustment means (not shown) for setting the axis Z—Z vertical. Secured to the base of the housing 11 for rotation therewith is a circular angle-encoder scale 12 which co-operates with a stationary reader device (not shown), mounted on the stationary support 11', to provide an electrical output signal indicative of the angular position of the head 10 at any given time.

Mounted in the cylindrical wall of the housing 11 are a pair of cylindrical lenses 13 and 14, of which the long axes are oppositely skewed relative to the axis Z—Z so that the two lenses are in a symmetrical inverted-V configuration. At the axis Z—Z, and in the plane perpendicular thereto which passes through the midpoints 13' and 14' of the two lenses, a photosensor 15 is mounted with its sensitive surface directed towards a point midway between the midpoints of the two lenses, so that it is exposed to both lenses equally. The lenses are of such focal length that each will produce, from a remote point object aligned with the photosensor and the lens midpoint 13' or 14', a line image which extends, in space, parallel with the long axis of the respective lens and with its midpoint in focus on the photosensor. The diagrammatic sectional view of the head 10 shown in FIG. 2 is taken In the horizontal plane which contains the photosensor 15 and the midpoints 13' and 14' of the two lenses, and shows a remote point source of light S which is also in that plane and is aligned with the photosensor 15 and the midpoint 13' of the lens 13. To take a directional measurement of the source S, the sensor head 10 is rotated, and as it rotates through the illustrated position the midpoint of the line image of the source S formed by the lens 13 transits across the photosensor 15 which therefore produces an electrical output pulse. After further rotation of the head 10 through an angle $\theta$, the angle subtended at the photosensor 15 between the midpoints 13' and 14' of the two lenses, the midpoint of the line image of the source S produced by the lens 14 similarly transits across the photosensor which therefore produces a further output pulse. Each output pulse, suitably amplified, Is caused (by circuitry not shown) to trigger a read-out, at the instant of its peak value, of the instantaneous value of the coded angular-position signal derived from the scale 12, and those read-out values are stored In a memory device (not shown). The mean of these two values gives the angular position of the head 10 as the line 16, which bisects the angle $\theta$ defined by the lens midpoints 13' and 14', sweeps through the source S, and this mean value, computed automatically from the two read-out values stored In the memory device, measures the azimuthal position of the source S relative to some predetermined zero position.

FIG. 3(1) is a representation of the two line-image components, of the image of the source S formed by the lenses 13 and 14, which sweep across the photosensor 15 when the source S is in the plane of FIG. 2. As described above, the points A and B of the leading and trailing line images L and T (formed by the lenses 13 and 14 respectively) which transit across the photosensor 15 are the midpoints of the line images. If the source S Is above the plane of FIG. 2, however, the line images L and T are displaced downwardly relative to the photosensor 15, as shown In FIG. 3(11). Consequently the points A and B of the two oppositely inclined line images L and T which transit across the photosensor are nearer the upper ends of the images and their angular separation Is reduced. Similarly, if the source S is below the plane of FIG. 2, the line images L and T are displaced upwardly, as shown In FIG. 3(iii), and their points A and B which transit across the photosensor 15 are nearer their lower ends and thus have an increased angular separation. In all three cases, the azimuthal position of the source S is obtained as the mean of the two read-out values stored in the memory; and the elevation of the source S is derivable from the difference between these two values, automatically, by a computer (not shown) comprised by the instrument. Thus the invention enables both the azimuthal and elevational components of the direction of a source object or target to be measured automatically, simply by rotating the sensor head of the instrument.

The source S, which is the equivalent of a surveyor's staff for use with a theodolite, may conveniently be a photoluminescent diode (LED) emitting radiation in the infra-red waveband, though a source radiating in any part of the electromagnetic spectrum may be used provided, of course, that it is one to which the photosensor 15 is responsive. If desired, the radiation output from the source S may be modulated, either to improve the signal-to-noise ratio of the signals received and processed by the measuring Instrument and/or to enable each of several sources S, modulated at different frequencies, to be individually identified, measured and memorized by the instrument. Although the foregoing disclosure of the invention has all been In terms of a point source of radiation as the target to be measured, it is also within the scope of the invention to use a target constituted by a "hole" in a relatively large radiating area. In that case, the images formed by the lenses 13 and 14 would be dark lines on a bright background, rather than bright lines, and their detection would be different in detail; but the measurement process would be essentially the same. Multiple "sources" of this kind, i.e. "holes", can still be measured, since several radiating areas can be differently modulated, thereby separately Identifying the "hole" of each.

The accuracy with which the transits of the image lines L and T across the photosensor can be sensed can be increased if, as shown in FIG. 4, the single photosensor 15 is replaced by two photosensors 15a and 15b, one above the other, each with a photosensitive area bounded by edges which are parallel to the image lines L and T. If these photosensors have their outputs connected in opposition, then, as the image line L transits across first the photosensor 15b and then the photosensor 15a, the combined output is two opposite-going pulses, shown as (L) in FIG. 5, with a zero-crossing point between them. Similarly, the image line T, which transits first across the photosensor 15a, gives rise to the pair of pulses shown as (T) in FIG. 5 which are in the reverse order but also have a zero-crossing point between them. Using the zero-crossing points as the events which trigger read-outs from the angle encoder enables very accurate angle measurements to be obtained. In addition to providing a degree of common-mode rejection of ambient light noise, this configuration of photocells effectively discriminates between the leading and trailing line images L and T, with their different "pulse signatures", and enables a false initiation of a measurement, due to the trailing beam T arriving first at the sensors, to-be prevented.

It will be understood that although the lenses 13 and 14 as described above are in a inverted-V configuration they may equally well diverge the other way, in an upright-V configuration. Also, there is no requirement for their nearest-together ends to be closely spaced : the two lenses may be quite widely spaced apart around the circumference of the housing 11. Furthermore, as shown in FIG. 6, mirrors may be employed instead of the lenses 13 and 14. As shown in FIG. 6, the photosensor 15 is mounted on the wall of the housing 11 at one end of a diameter 17, and faces along that diameter. Symmetrically on opposite sides of this diameter two concave cylindrical strip mirrors 18 and 19 are mounted in the housing 11, to reflect on to the photodetector 15 light beams 20 and 21, incident upon them through two windows 22 and 23 formed in the housing, which would otherwise have passed through the axis Z—Z of the housing. The mirrors 18 and 19 are skewed in opposite senses with respect to the axis Z—Z, so that the line images which they form of a distant point light source are also skewed. It will be seen that this arrangement is completely analogous to that using lenses, as previously described; and it will be understood that in this case also the detector 15 may be replaced by detectors 15a and 15b as described with reference to FIGS. 4 and 5.

The angle encoder from which read-outs of angular position of the detector head 10 are obtained may be of any suitable known kind. For example, it may be a moiré fringe digital angle encoder which produces an electrical pulse for each unit of angular rotation, with a double-width pulse or a missing pulse to mark the zero direction of the circular scale. Constant or accurately determined speed of rotation is not a requirement, and in a simple form of instrument suitable, for example, for simple surveying work, the sensor may be freely rotatable so that it may be spun manually to cause it to make at least one or two revolutions before coming to rest. Alternatively, the sensor head may be motor driven, by means of a motor incorporated in the instrument, so that in use the sensor head rotates continuously at substantially constant speed. In such a case, it may be preferred to provide a relatively coarse incremental angle encoder, in combination with an electronic timer producing higher-frequency timing pulses which are used for time interpolation between the encoder pulses so as to yield the desired "fine" readings of angular position.

A motor-driven and continuously operating instrument in accordance with the invention, which may be physically small and portable, may be used to determine both the position and orientation, and movement, of a body in space. The body is provided for this purpose with a fixed and known array of point-source targets, and in a single sweep of the sensor head of the instrument the instantaneous direction from the instrument to each of these targets is determined. By analyzing the geometry of such an arrangement by the technique of spatial resection, which is commonly used in photogrammetry, the full 3-D position and orientation of the array can be measured both rapidly and automatically. If the body is in motion, each revolution of the sensor head provides updated data as to its instantaneous position.

A similar application of the invention exists in the spatial calibration of production robot end-effectors, obviating the need to take the robots off-line. The invention may also be applied in the remote guidance of vehicles which are required to follow pre-programmed trajectories, such as tunnel-boring machines, and in surveying where an array of targets on a staff or rod can be used to determine the 3-D position of its 'foot', and thus enable a ground-feature map to be produced from an unattended instrument.

We claim:

1. A direction-measuring instrument for measuring a direction of a remote source of radiation comprising:
   support means;
   a detector head rotatably mounted on said support means for rotation about a fixed axis; and
   position-indicating means for providing an output signal indicating a rotational position of the detector head,
   said detector head comprising:
      detector means including two detectors disposed side-by-side in said fixed axis direction sensitive to a radiation emitted by the remote source; and
      means for forming an image of the remote source which transits across the detector means in a transit direction as the detector head rotates, said mean for forming an image being such that the image formed comprises two line-image components which extend transversely to the transit direction and which are oppositely inclined to said transit direction; and
      said detector means being arranged, in response to the transit across it of each line-image component, to cause an instantaneous angular position of the detector head as indicated by the position indicating means to be recorded;
   computing means for deriving a first and a second component measurement of the direction of the remote source, said first component measurement being from a mean of two recorded angular positions and said second component being from a difference between said two recorded angular positions.

2. A direction-measuring instrument as claimed in claim 1, wherein the means for forming an image comprises a first and a second elongate cylindrical lenses mounted with a long axis of said first lens being oppositely skewed to a long axis of said second lens relative to the axis of rotation of the detector head and forming, of said remote source, correspondingly oppositely skewed line images which transit across the detector means as the detector head rotates.

3. A direction-measuring instrument as claimed in claim 1, wherein the means for forming an image comprises a first and a second elongate concave cylindrical mirror mounted with a long axis of said first mirror being oppositely skewed to a long axis of said second mirror relative to the axis of rotation of the detector head and forming, of said remote source, correspondingly oppositely skewed line images which transmit across the detector means as the detector head rotates.

4. A direction-measuring instrument for measuring a direction of a remote source of radiation according to claim 1, wherein said two detectors of said detector means have outputs connected in opposition.

5. A method of measuring a direction of a remote source of radiation comprising:
   providing, in fixed relationship to one another and rotatable together about a fixed axis, detector means including two detectors disposed side-by-side in said fixed axis direction sensitive to radiation emitted by the remote source, and an image-forming means;
   forming an image of the remote source with the image-forming means, said image comprising two line-image components oppositely skewed with respect to said fixed axis;
   rotating the detector means and the image-forming means together about said fixed axis and thereby causing the two line-image components of the image formed to transit across the detector means;
   recording two angular positions of the detector means and image-forming means at which the respective line-image components transit across the detector means;
   deriving a first component measurement of the direction of the remote source from a mean of the two recorded angular positions; and
   deriving a second component measurement of the direction of the remote source from a difference between said two recorded angular positions.

6. A method of measuring a direction of a remote source of radiation according to claim 5, wherein said two detectors of said detector means have outputs connected in opposition.

* * * * *